United States Patent [19]
Schnizler, Jr.

[11] 3,970,323
[45] July 20, 1976

[54] CHUCK FOR DRILL
[75] Inventor: Albrecht Schnizler, Jr., Nurtingen, Germany
[73] Assignee: Metabowerke KG Closs, Rauch, & Schnitzler, Nurtingen, Germany
[22] Filed: Aug. 5, 1974
[21] Appl. No.: 494,912

[30] Foreign Application Priority Data
Aug. 17, 1973   Germany............................ 2341642

[52] U.S. Cl.................................... 279/64; 279/56; 279/81
[51] Int. Cl.²..................... B23B 31/10; B23B 31/24
[58] Field of Search ................... 279/63, 64, 62, 80, 279/81, 61, 91, 56

[56] References Cited
UNITED STATES PATENTS
1,705,275   3/1929   Neudeck............................. 279/64
2,458,824   1/1949   Axelsson............................. 279/64
2,731,273   1/1956   Edens.................................. 279/81
2,960,343   11/1960  Elledge............................... 279/81
3,506,277   4/1970   Harms................................. 279/63 X
3,545,776   12/1970  Haviland............................ 279/63
3,795,406   3/1974   Röhm.................................. 279/64 X Primary Examiner—Othell M. Simpson
Assistant Examiner—William R. Briggs
Attorney, Agent, or Firm—Walter Becker

[57]   ABSTRACT

A drill chuck having a body adapted for connection to a spindle and a clamping member rotatable on the body and operable to actuate clamping jaws. Cooperating and selectively releasable elements of a spring loaded pawl and ratchet device are carried by the body and clamping member and lock the clamping member to the body in clamping position.

14 Claims, 8 Drawing Figures

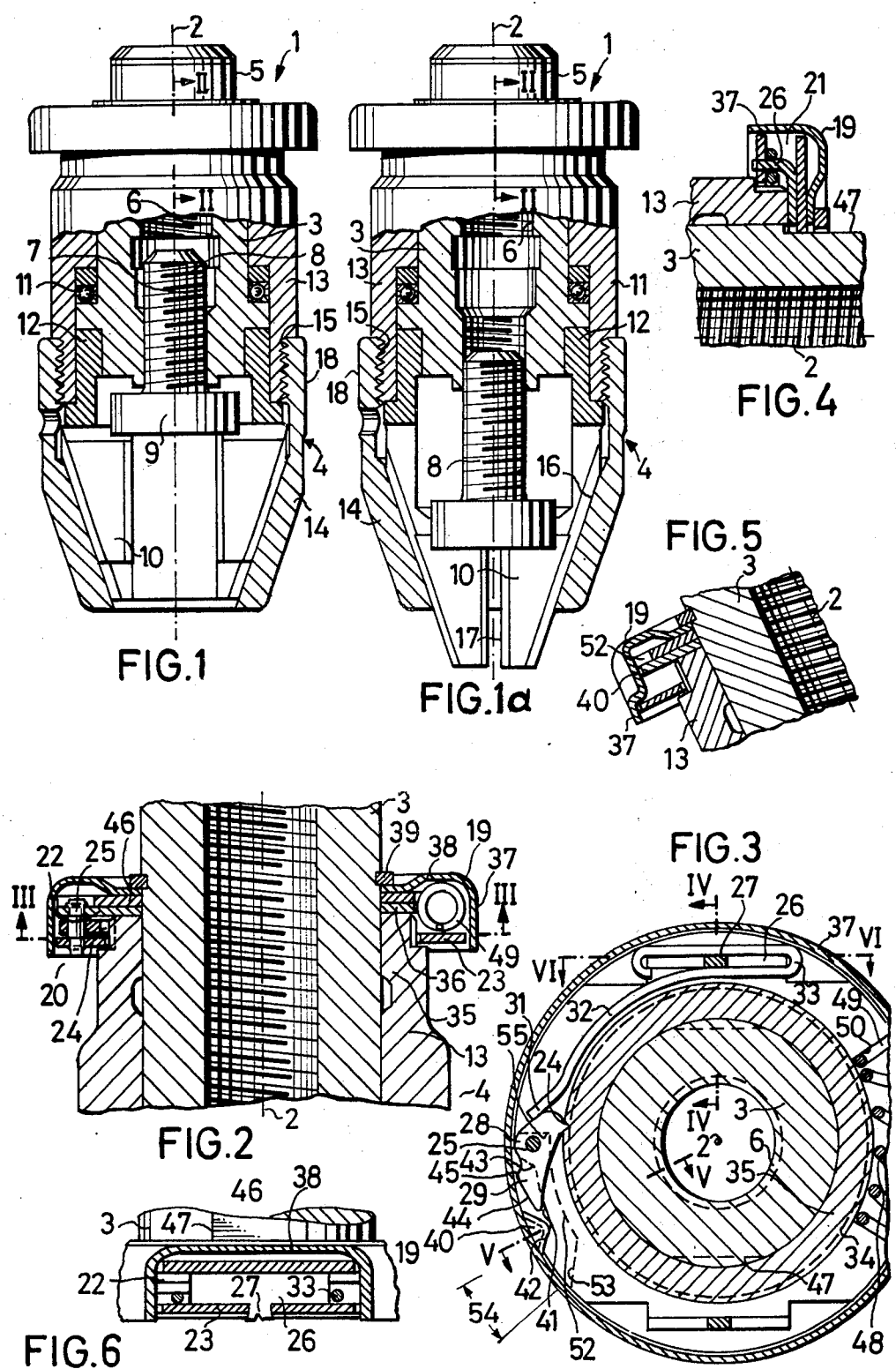

CHUCK FOR DRILL

The present invention relates to a chuck for drills, or the like, with a chuck body for connection to a working spindle, or the like. On said chuck body there is provided a clamping element which is rotatable about the axis of the chuck and which is equipped with clamping jaws displaceably arranged at an incline with regard to the chuck axis for which clamping jaws, for maintaining engagement with the drill, or the like, there is provided a safety device for adjusting said clamping jaws.

It is an object of the present invention so to design a chuck according to the above mentioned general type that with a simple construction and safe function a good clamping action of the tool will be assured also when, for instance, due to vibrations, briefly a play develops between the clamping jaws and the tool shaft or when the clamping jaws have dug into the tool shaft.

This object and other objects and advantages of the invention will appear more clearly from the following specification, in connection with the accompanying drawing, in which:

FIGS. 1 and 1a illustrate in two different positions, a chuck according to the invention, partially in axial section and partially in view.

FIG. 2 is a section taken along the line II—II of FIG. 1 and FIG. 1a, but on a greater scale than that of FIG. 1 and FIG. 1a.

FIG. 3 represents a section taken along the line III—III of FIG. 2

FIG. 4 is a section taken along the line IV—IV of FIG. 3.

FIG. 5 is a section taken along the line V—V of FIG. 3.

FIG. 6 represents a section taken along the line VI—VI of FIG. 3.

Figure 3A:
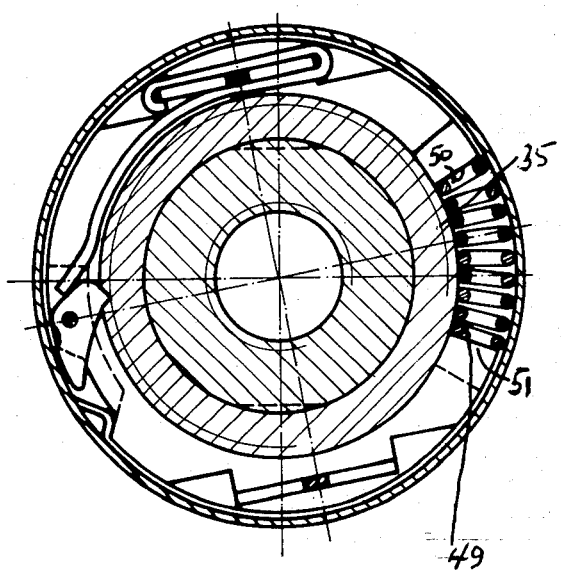
FIG. 3a represents structure of FIG. 3 wherein a spring is shown in a compressed clamping position.

The chuck according to the present invention, which includes a safety device for keeping the clamping jaws in engagement with the drill, and is adapted to adjust the clamping jaws in clamping direction, is characterized primarily in that the safety device includes a spring which at least in clamping position on one hand is supported relative to the chuck, and on the other hand is supported relative to the clamping jaws. In this way, the chuck according to the invention is suitable particularly for machines which are subjected to vibrations, such as impact drilling machines, because always an automatic post-clamping is effected. This automatic post-clamping is advantageous particularly when the chuck is designed as a wrenchless chuck, in other words, is so designed that it is actuated for chucking purposes merely by hand when resorting to a wrench.

Due to the fact that the post-chucking with the chuck according to the invention is effected by a spring, the post-chucking force can be determined precisely and can be held constant so that in contrast to a drill chuck in which the drill pressure is employed for post-chucking the clamping jaws, such high post-chucking force may occur that a release of the clamping jaws by hand is no longer possible or only under great difficulties.

A particularly advantageous further development of the present invention consists in that the spring is arranged on a first of the two parts which are rotatable relative to each other, preferably on the chuck body and is rotatable about the chuck axis relative to the second one of these parts and in the respective clamping position can be arrested by means of an arresting device. In this way, the post-chucking force can in a simple manner and independently of the respective position of the clamping jaws, in other words, independently of the respective clamping diameter be selected, for instance, in such a way that the post-clamping force will be the same with each clamping diameter. Due to this arresting device, also a locking mechanism is obtained by means of which the clamping jaws are locked in their respective clamping position. In this connection, it is also possible to provide this locking mechanism which will be discussed further below in detail, also without spring directly between the parts rotatable relative to each other.

Referring now to the drawing in detail, the chuck 1 illustrated therein comprises a chuck body 3 which forms a rotatable body for rotation about the chuck axis 2, and furthermore comprises a sleeve-shaped clamping or chucking member 4 which surrounds said chuck body 3 and protrudes beyond the chuck body 3 toward the front or clamping side 5 of chuck 1. The chuck body 3 protrudes beyond the chucking member 4 on that end of the chuck 1 which is located on the machine side or at the rear end of the chuck 1. The chuck body 3 forms a rear protruding connecting end 5 for connection to a machine spindle or the like. This connecting end 5 may be provided with a threaded bore 6 located in the axis 2 of the chuck, and furthermore may be provided with an inner cone or similar connecting element for connection to a working spindle. Guided in the chuck body 3 in a threaded bore 7 provided on the front end of said chuck body in the axis 2 of the chuck is a clamping spindle 8 with thread. This spindle 8 has its front end provided with a follower head 9 which in the axial direction of the chuck is positively connected to clamping jaws 10 which are uniformly distributed around the axis 2 of the chuck. FIG. 1a illustrates the clamping spindle 8 with the clamping jaws 10 occupying their foremost end position, whereas FIG. 1 shows the same elements in their rearward end position. The clamping element 4 is non-displaceable relative to the chuck body 3 in axial direction, but is journaled by means of two axial bearings 11 and 12 for rotation about the chuck axis 2. The axial bearings 11, 12 are supported by means of an annular collar projecting beyond the outer circumference of the chuck body 3. The clamping member 4 is formed by two sleeve portions 13, 14 arranged behind the other when looking in the axial direction of the chuck. These sleeve parts 13, 14 are by means of a screw connection 15, coaxial with the chuck 1, detachably interconnected. The rear sleeve part 13 which projects only slightly beyond the front end of the chuck body 3 includes the axial bearings 12, 11, whereas the front sleeve part 14 has its inner side provided with an inner cone 16 which is coaxial with the chuck axis 2. On said inner cone 16 there are guided the clamping jaws 10 by corresponding countersurfaces which are located at those sides which face away from the clamping surfaces 17. The clamping jaws as well as the clamping spindle 8 are in a positive manner rotatably connected to the clamping jaw 4 or are positively connected in the direction of rotation about the chuck axis 2 so that in response to a rotation of the clamping element 4 relative to the chuck body 3, the clamping spindle 8 is moved relative to the chuck body 3 in its longitudinal direction and relative to the clamping element 4 thereby taking along the clamping jaws 10. In order to secure the clamping jaws 10 against accidental turning relative to the clamping element 4, guiding means are provided in the front end of the sleeve part which forms the axial bearing 12, said sleeve part resting on the inner cone 16 by means of a front outer cone. These guiding means are provided in the form, for instance, of axial slots extending up to the front end which is slightly set back relative to the front end of the clamping jaw 4. Expediently, these guiding means are designed as positive guiding means and are undercut in cross section, especially in a T-groove manner. The groove bottom surfaces are formed by the inner cone 16, and the clamping jaws are secured by the positive guiding means against movements at a right angle to their countersurfaces in a direction toward the chuck axis 2. For purposes of turning the clamping element 4, the front sleeve portion 14 thereof has its cylindrical end section 18 which faces toward the sleeve part 13 provided with knurling, or the like, so that this section 18 can easily be grasped by a hand and the chuck can be used as a keyless drilling chuck. The clamping jaws 10 carry out their clamping operation toward the front chuck end so that not, as might also be visualized, by a correspondingly reversed arrangement of the wedge surfaces 16, the drilling pressure is made use of directly for the post-clamping of the clamping jaws 10.

Within the region of the rear end of the clamping element 4 there is in a protected manner arranged an arresting device 20 which is located in a housing 19 that is coaxial with the axis 2 of the chuck. This device or mechanism 20 is intended for arresting the clamping member 4 relative to the chuck body 3 in a desired position, especially in a clamping position, in which a tool is clamped in between the clamping jaws 10. This arresting mechanism or device comprises a cage 21 which is coaxial with the axis 2 of the chuck. Between the two disc-shaped annular end faces 22, 23 of cage 21 there is provided an arresting element 24 which is designed in the manner of a pawl and is equipped with a bearing bolt 25. This arresting element 24 is pivotable about an axis which is parallel to the chuck axis 2 and is shiftable from a release position to an arresting position and vice versa. The pot-shaped rotatably arranged housing 19 has its open side which is located toward the front end of the chuck substantially closed by an additional annular disc 23 of the cage 21. The two end faces 22, 23 are positively connected to each other by the fact that the rear end face has two transverse webs 26 which are located diametrically opposite to each other and are angled off while being parallel to an axial plane of the chuck. The transverse webs 26 are at their free longitudinal edges provided with relatively narrow protruding cams 27 for engagement in corresponding rectangular openings of the other end face or end wall 23. These cams 27 are by notching secured relative to said wall 23 by the fact that wall 23 is by means of its pertaining end face braced against the longitudinal edges of the transverse webs 26. The transverse webs 26 are offset by approximately 90° about the axis 2 of the chuck relative to the arresting element 24. The inner distance of the two end walls from each other corresponds approximately to twice their thickness. In bores of the end walls 22, 23, which bores are in axial alignment with each other there is inserted the bearing bolt 25 with its two ends which are reduced in diameter relative to the central section and, for instance, by riveting are so connected that the end faces of its central section which face away from each other engage those end faces of the end walls 22, 23 which face each other, and that the arresting element 24 has only a slight axial play on the central section of the bearing bolt 25. The arresting element 24 is formed by one arm of a two-arm lever 28, both arms of which are located substantially tangentially with regard to the axis 2. The other arm 29 of the lever 28 is with regard to the clamping direction, arrow 30 of the clamping element 4, located behind the arresting element 24 with regard to the chuck body 3.

That longitudinal edge of the arm which forms the arresting element 24 which faces away from the chuck axis 2 supports the obtuse angle-shaped and outwardly angled-off end 31 of a leg 32 which is curved about the axis 2 over an approximately quarter of a circle, said leg 32 pertains to a leg spring 33 under preload. This arresting spring 33 which is bent out of round steel wire for which practically no additional space is needed is connected to one of the two transverse webs 26 by means of a C-shaped connecting section. This connection is effected by the connecting section engaging with its main web over its entire surface the outside of the transverse web while its end legs embrace the end edges of the transverse web 26. The end leg which is located further away from the arresting element 24 merges at its center of the length of the transverse web 26 with the pitch circle-shaped curved leg 32. The common central plane passing through the axis 2 of the chuck and pertaining to the two transverse webs 26 is located at a right angle with regard to the axial plane of the pivotal mounting of the arresting element 24, said axial plane passing through the axis 2 of the chuck.

The spring-loaded arresting element 24 has a triangular arresting cam which is directed toward the axis 2 and in axial view extends substantially at a right angle. The flanks of the arresting cam are in arresting position located substantially symmetrically with regard to the axial plane of the chuck, which plane passes through its tip. For the positive engagement of said arresting cam on counter element 34 there is provided a corresponding gear ring which is located at the rear end reduced in diameter of the rear sleeve section 13 of the clamping element 4. The gear ring 34, the tooth pitch of which is rather small extends in the form of outer teeth over the entire length of this rear end section 35 and by means of an annular shoulder merges with that section which is adjacent thereto and extends forwardly. The front end wall 23 of cage 21 is directly adjacent to said annular shoulder and extends over the latter up to the outer circumference of the gear ring 34. The rear end wall 22 of cage 21 slidably rests its rear end face on the rear end or end surface 26 of the rear sleeve part 13 of the clamping element 4.

The substantially cylindrical mantle of the housing 19 which may be designed, for instance, as a deep drawing element, forms a kind of handle 37 which at its outer circumferential surface may be provided with a knurled or similar surface and the outer diameter of which may be greater than that of the section 18 of the clamping element 4. By means of said handle 37 which is movable between a release and an arresting position, the arresting element may at will by an outside operation be disengaged at any desired time. Between this handle 37 and the gear ring 34 there is located the arresting element 24. The inner diameter of the handle 37 or housing 19 is only slightly greater than the outer diameter of the end walls 22, 23, and the axial extension of the handle 37 or housing 19 is only slightly greater than that of the arresting device 20 or that of the cage 21. The handle 37 or housing 19, the end wall 38 of which is located on that side of the arresting element 24 which faces away from the chucking element 4 or annular surface 36, is axially non-displaceably mounted toward the front by supporting it relative to the annular surface 36 and toward the rear by supporting it by a safety ring 39. The safety ring 39 is located in a depressed central inner zone of the end wall 38 and on the outside thereof. The handle 37 or housing 19 is rotatable on the chuck body 3 relative to said chuck body 3 and relative to the mounting of the arresting member 24. More specifically, the handle 37 is rotatable about the chuck axis 2 by predetermined angles. The handle 37 or housing 19 has a release cam 40 which projects toward the axis 2 of the chuck beyond the inner side of the mantle. This cam 40 extends only beyond a section of the mantle or handle 37 up to the end wall 38 in such a way that it is not effective for the front end wall 23 of the cage but ends in the vicinity of the inner end face of said end wall 23. The release cam 40 which has, for instance, a flank angle of 90° and is designed symmetrically with regard to an axial plane of the chuck extends into an opening 41 which has the shape of a partial ring sector and is located on the outer circumference of the rear end wall 22. This opening 41 has two end edges 42, 43 which in conformity with the respective pertaining flank of the release cam 40 are located at a slant in such a way that the opening 41 widens toward the outside. When turning the clamping element 4 in chucking direction indicated by the arrow 30 relative to the chuck body 3 and when simultaneously holding the chuck body 3 stationary by means of the handle 37 which in release position is rotatably positively connected to the second counterbearing 22, the release cam 40 engages the rear end edge 42 (with regard to the chucking direction indicated by the arrow 30) so that the cage 21 is likewise held fast. When turning the chucking element 4 relative to the chuck body 3 in the opposite direction of rotation, and when simultaneously holding stationary the handle 37, the release cam 40 turns in the direction toward the release arm 29. The release arm 29 has at that edge thereof which faces away from the chuck axis 2, a receiving surface 44 which inclines toward the outside and onto which the release cam 40 moves in such a way that the release arm 29 is pivoted in the direction toward the chuck axis and thereby the arresting element 24 is pivoted toward the release position against the thrust of spring 32 and is held in this position. Adjacent to the surface 44, the release arm 29 has an arresting recess 45 which is directly adjacent to the bearing bolt 25, which arresting recess 45 can be positively engaged by the release cam 40 at the end of its last described relative movement. In this position, the handle 37 is frictionally secured relative to the cage 21 about the chuck axis 2, and the arresting element 24 is simultaneously in release position held out of engagement with the counterelement 34. In this position, the chucking element 4 is adapted to be turned in both directions relative to the chuck body 3 without the arresting member 24 jumping in a latch-like manner over the gear ring 34. The second end surface 43 of opening 41 may be so located that the release cam 40 when engaging the arresting recess 45 is supported thereby or engages the same. When turning the chucking element 4 in chucking direction, the release cam 40 jumps out of the arresting recess 45 when the force at which the cage 21 is held relative thereto exceeds a certain value determined by the arresting spring 33.

The rear end wall 22 of cage 21 as well as an annular disc 46 engaging the outer end face of wall 22 and the inner end face of wall 38 of housing 19, form two counterbearings of the same diameter and of approximately the same disc thickness, said counterbearings being located at a right angle to the chuck axis 2 and directly adjacent to each other. However, the first counterbearing 46 is in the direction of rotation positively mounted on a two-corner member 47 provided on the outer cirumference of the chuck body 3, and thus, in contrast to the second counterbearing 22 is not able to carry out any rotary movements relative to the chuck body 3. Symmetrically located with regard to the axial plane passing through the bearing bolt 25 and pertaining to the chuck, and diametrically opposite to the bearing bolt 25, the two counterbearings 22, 46 have two cutouts 48 which have the shape of a partial ring and which have such a contour as to cover each other when placed upon each other. The shortest diameter of the cutouts 48 is only slightly greater than the outer diameter of the countermember 34. The cutouts 48 cover an arc angle of less than 90°, perferably approximately 60°. Inserted into these cutouts 48 is a helical pressure spring 49 which extends along a partial circle about the chuck axis 2. The helical pressure spring 49 is located in the housing 19 nearly play free and while saving space is located between the end wall 38 of housing 19, the mantle of said housing, the front end wall 23 of cage 21, and the inner part edges of the cutouts 48, as far as possible from the chuck tool. The ends of spring 49 are safely supported by the end edges 50, 51 of the cutouts 48 which end edges are located in the axial planes of the chuck. The cutouts 48 cover each other, for instance, at the starting position of spring 49 so that the spring in this starting position can be preloaded in a simple manner, and a very favorable effective spring characteristic line can be realized.

If, during the chucking of the chuck, the handle 37 is, by engagement of the abutment surface 42 by the release cam 40, positively connected to the counterbearing 22, the chuck body 3 is, through the intervention of this counterbearing 22, the spring 49, the counterbearing 46, and the two-corner member 47 held fast relative to the chucking element 4. This may also be effected in correspondingly low resistance by the release cam 40 engaging the arresting recess 45. As soon as the chucking jaws 10, for instance, by engaging a tool shank, encounter a resistance moment directed against the chucking movement, and the chucking jaws 10 are thus prevented from further moving, and as soon as the chucking element 4 is arrested relative to the chucking body 3, it will be possible by turning the handle 37 in the direction counter to the direction of the arrow 30 to turn the counterbearing 22 relative to the chuck body 3 and relative to the counterbearing 46 which is positively rotatably connected to the chuck body 3, and relative to the clamping element 4 against the thrust of spring 49. In this connection, the arresting element 24 which is located approximately in the plane of spring 49 and is arranged approximately diametrically opposite to the chuck axis 2, jumps over the teeth of the counterelement 34. When the handle 37 is released, the arresting element 24 locks the counterbearing 22 in its corresponding position relative to the chucking element 4 so that the chuck body 3 and the chuck element 4 are spring loaded in their relative direction of rotation provided for chucking, said spring loading being effected by the spring 49. The arresting device 20 is arrestable relative to the spring stroke of the spring in considerably smaller angle steps and approximately in a stepless manner. When the chucking jaws 10 are nonmovably guided on the chucking element 4 about the chuck axis 2, i.e., when the chuck jaws 10 are rotatable with the chucking element 4 relative to the chuck body 3, it is possible with the rotary clamping direction of the chucking element 4 counter to the rotary work direction, to make use of the countertorque exerted by the tool on the chucking jaws 10 during drilling, or the like, likewise for purposes of post-chucking. In such an instance the spring 49 serves, above all, for always assuring an engagement even though a slight engagement of the tool shank by the clamping jaws 10 so that said tool shank will by friction exert a load upon the clamping jaws and thereby upon the clamping element in the chucking direction, said torque bringing about the proper post-chucking. Thus, during the chucking of the tool it will suffice to apply a very low clamping force because the tool will, as soon as it engages a workpiece, due to the occurring countertorque, immediately bring about a post-chucking which increases with said countertorque.

The first counterbearing 46 likewise has an annular sector-shaped opening 52, the arc angle of which with regard to the chuck axis 2 is greater than that of the opening 41 in such a way that the opening 41 with the counterbearings 22, 46 occupying the starting position of FIG. 3 will be located approximately in the center of the length of opening 52. The end edge 53 of the opening 52, which when viewing in rotary clamping direction of the handle 37 is located in front is arranged in the path of movement of the releasing cam 40. This cam 40 will, when the spring 49 is tensioned in the described manner, abut said end edge 53 so that a further relative movement between the counterbearings 22, 46 in the clamping direction will not be possible, and thus the maximum spring stroke 54 of spring 49 or its maximum post-tensioning force is fixed. The other end edge 55 of the opening 52 with the starting position of the two counterbearings 22, 46 engages the corresponding end of the bearing bolt 25 which by means of said end engages the opening 52 so that the starting position of the two counterbearings 22, 46 is fixed relative to each other by abutment. The said end protrudes beyond the outer end face of the counterbearing 22. In this way, also the starting position of spring 49 is limited by abutment because the two counterbearings 22, 46 include interengaging abutments which are formed by the second end edge 55 of the partial annular sector-shaped opening 52 of the first counterbearing 46 or by the bearing bolt 25 of the arresting member 24. If, during the chucking of the chuck, the chuck body 3 is directly held stationary and not by the handle 37, the arresting device 20 with the spring 49 included may in this way remain out of function.

For purposes of relieving the arresting device 20 and for returning the spring 49 to its starting position, the handle 37 is turned in the direction of the arrow 30. During this operation, the disengaging cam 40 will in the manner described move onto the surface 44 and engage the arresting recess 45 so that the arresting element 24 is moved into its disengaging position and is held in this position. Due to the fact that the two counterbearings 22, 46 are freed relative to each other and that also the spring 49 is freed, the spring 49 can return to its starting position. At the same time, the arresting position between chuck body 3 and chucking element 4 is made ineffective so that the element 4 can be turned for relieving or disengaging the clamping jaws.

With the chuck according to the invention, only rotary movements about the axis 2 of the chuck are necessary for purposes of chucking and unchucking. Consequently, a structurally simple design and a high degree of safety is realized, particularly with regard to the arresting position of the arresting device 20. Inasmuch as the arresting device 20 is relative to the two chuck parts which are movable relative to each other is not directly positive or mechanically rigid, but is supported relative to one of these parts by means of an elastic intermediate member in the form of spring 49, there is always automatic post-clamping assured.

It is, of course, to be understood that the present invention is, by no means, limited to the specific showing in the drawings, but also comprises any modifications within the scope of the appended claims.

What is claimed is:

1. A drill chuck comprising; a chuck body adapted at one end for driving connection to a spindle, a clamping member rotatably supported on said body and having clamping jaws angularly displaceably mounted therein, rotation of said clamping member on said body actuating said jaws in opening and closing direction, a safety device for holding said clamping member in jaw closed position and including an element engageable with said clamping member, and a spring bearing between said element and said body and biasing said element in a direction to urge said clamping member in clamping direction, said spring acting between a first member fixed to said body and a second member rotatable on said body, said element being mounted on said second member, said first and second members being in substantially face to face engagement in a plane perpendicular to the axis of the chuck, said spring comprising a compression spring in said plane and extending part way around the said body, said first and second members being peripherally notched, said spring being mounted in said notches.

2. A drill chuck according to claim 1 in which said first and second members are annular discs coaxial with the chuck, said discs engaging one end of said clamping member, and a stop ring detachably mounted on said body and engaging the side of said discs facing away from said clamping member.

3. A drill chuck according to claim 2 in which said element has a pawl nose engaging the periphery of said clamping member adjacent said one end thereof, a spring biasing said pawl nose toward said clamping element, said clamping member being toothed in that axial region engaged by said cam nose, a third disc spaced from said second disc along said clamping member, said element being pivotally connected to said second and third discs.

4. A drill chuck according to claim 3 which includes means connecting said second and third discs together for rotation as a unit, said notches in said first and second discs being disposed substantially diametrally opposite said element.

5. A drill chuck according to claim 3 in which the spring biasing said pawl nose has one end connected to said second disc and an intermediate part curving about the clamping member and the other end part bearing against said element.

6. A drill chuck comprising; a chuck body adapted at one end for driving connection to a spindle, a clamping member rotatably supported on said body and having clamping jaws angularly displaceably mounted therein, rotation of said clamping member on said body actuating said jaws in opening and closing direction, a safety device for holding said clamping member in jaw closed position and including an element engageable with said clamping member, a spring bearing between said element and said body and biasing said element in a direction to urge said clamping member in clamping direction, said element being a two armed lever having a pawl nose on the end of one arm, said clamping member having a toothed region engaged by said pawl nose, a disc pivotally supporting said lever and spring biased in a direction to cause said pawl nose to urge said clamping member in clamping direction, a cup rotatable on said body and having a rim part dependent about said disc and element, and a cam nose inside said rim part, and the other arm of said lever being engageable by said cam nose to move said lever in the direction to disengage said pawl nose from said clamping member.

7. A drill chuck according to claim 2 which includes cooperating elements of stop means on said discs limiting the relative rotary movement thereof.

8. A drill chuck comprising; a chuck body adapted at one end for driving connection to a spindle, a clamping member rotatably supported on said body and having clamping jaws angularly displaceably mounted therein, rotation of said clamping member on said body actuating said jaws in opening and closing direction, a safety device for holding said clamping member in jaw closed position and including an element engageable with said clamping member, a spring bearing between said element and said body and biasing said element in a direction to urge said clamping member in clamping direction, and a cup-shaped housing rotatable on said body and having a dependent rim surrounding said safety device, said rim at the lower end being closed by a disc to which said element is pivoted.

9. A drill chuck according to claim 8 in which said spring acts between a first member fixed to said body and a second member rotatable on said body, said element being mounted on said second member.

10. A drill chuck according to claim 8 in which said spring is a compression spring and is disposed with the axis in a plane perpendicular to the axis of the chuck and extending partway around said chuck body.

11. A drill chuck according to claim 8 in which said clamping member has a conical bore therein with axial grooves, said jaws being seated in said grooves, and actuating means connected to said jaws and threaded into said body.

12. A drill chuck according to claim 11 in which said clamping member comprises axial portions threaded together, and bearings between said clamping member and said body rotatably but nonaxially moveably supporting said clamping member on said body.

13. A drill chuck according to claim 6 which includes means for latching said cam nose to said lever to hold the pawl nose in release position.

14. A drill chuck according to claim 6 in which rotation of said cup in one direction moves said lever relative to said clamping member in a direction to load the biasing spring for said lever, said cup when rotated in the other direction moving said cam nose into engagement with said lever.

* * * * *

UNITED STATES PATENT OFFICE
CERTIFICATE OF CORRECTION

Patent No. 3,970,323            Dated July 20, 1976

Inventor(s) Albrecht Schnizler, Jr.

It is certified that error appears in the above-identified patent and that said Letters Patent are hereby corrected as shown below:

On the cover sheet Item (73) should read:

-- Metabowerke KG. Closs, Rauch & Schnizler, Nurtingen, Germany --.

Signed and Sealed this

Nineteenth Day of October 1976

[SEAL]

Attest:

RUTH C. MASON
*Attesting Officer*

C. MARSHALL DANN
*Commissioner of Patents and Trademarks*